(12) United States Patent
Dellacha et al.

(10) Patent No.: US 8,914,512 B2
(45) Date of Patent: Dec. 16, 2014

(54) METHOD AND SYSTEM FOR DEFINING ADDITIONAL RESOURCES IN A USER MANAGEMENT SYSTEM OF A MANUFACTURING EXECUTION SYSTEM

(75) Inventors: Alessio Dellacha, Genoa (IT);
Francesco Russo, Arenzano (IT);
Giorgio Repetto, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 418 days.

(21) Appl. No.: 12/975,431

(22) Filed: Dec. 22, 2010

(65) Prior Publication Data
US 2011/0153830 A1 Jun. 23, 2011

(30) Foreign Application Priority Data
Dec. 22, 2009 (EP) ...................................... 09180459

(51) Int. Cl.
*G06F 15/173* (2006.01)
*G06Q 10/10* (2012.01)
(52) U.S. Cl.
CPC ...................................... *G06Q 10/10* (2013.01)
USPC ........................................................ 709/226
(58) Field of Classification Search
USPC .................................. 709/203, 224–226, 229
See application file for complete search history.

(56) References Cited

U.S. PATENT DOCUMENTS

| 2002/0065879 A1* | 5/2002 | Ambrose et al. ............... 709/203 |
| 2003/0065795 A1* | 4/2003 | Bortoloso et al. ............ 709/229 |
| 2006/0230149 A1* | 10/2006 | Jackson ........................ 709/226 |
| 2009/0158237 A1* | 6/2009 | Zhang et al. .................. 717/100 |

FOREIGN PATENT DOCUMENTS

EP 1 298 514 A1 4/2003

* cited by examiner

*Primary Examiner* — Joon H. Hwang
*Assistant Examiner* — Kidest Mendaye
(74) *Attorney, Agent, or Firm* — Laurence A. Greenberg; Werner H. Stemer; Ralph E. Locher

(57) ABSTRACT

A method and a system for defining additional resources in a user management system in a MES system includes providing a custom resource database at the server side with entries editable at engineering time or at run time. At engineering or at run time, a client application requests, via a local user management service, the definition of a custom resource from a centralized user management service, which in turns adds an entry related to the requested custom resource in the custom resource database. At run time, at a given event, the centralized user management service, beside transmitting other data to the local user management service, also transmits from the custom resource database additional data on the custom resources associated with the user and user groups as well as additional data on a second set of script files associated to the custom resources. In turn, the local user management service creates also with the additional data the related entries into the access database and executes the second set of scripts.

6 Claims, 2 Drawing Sheets

Figure 1:
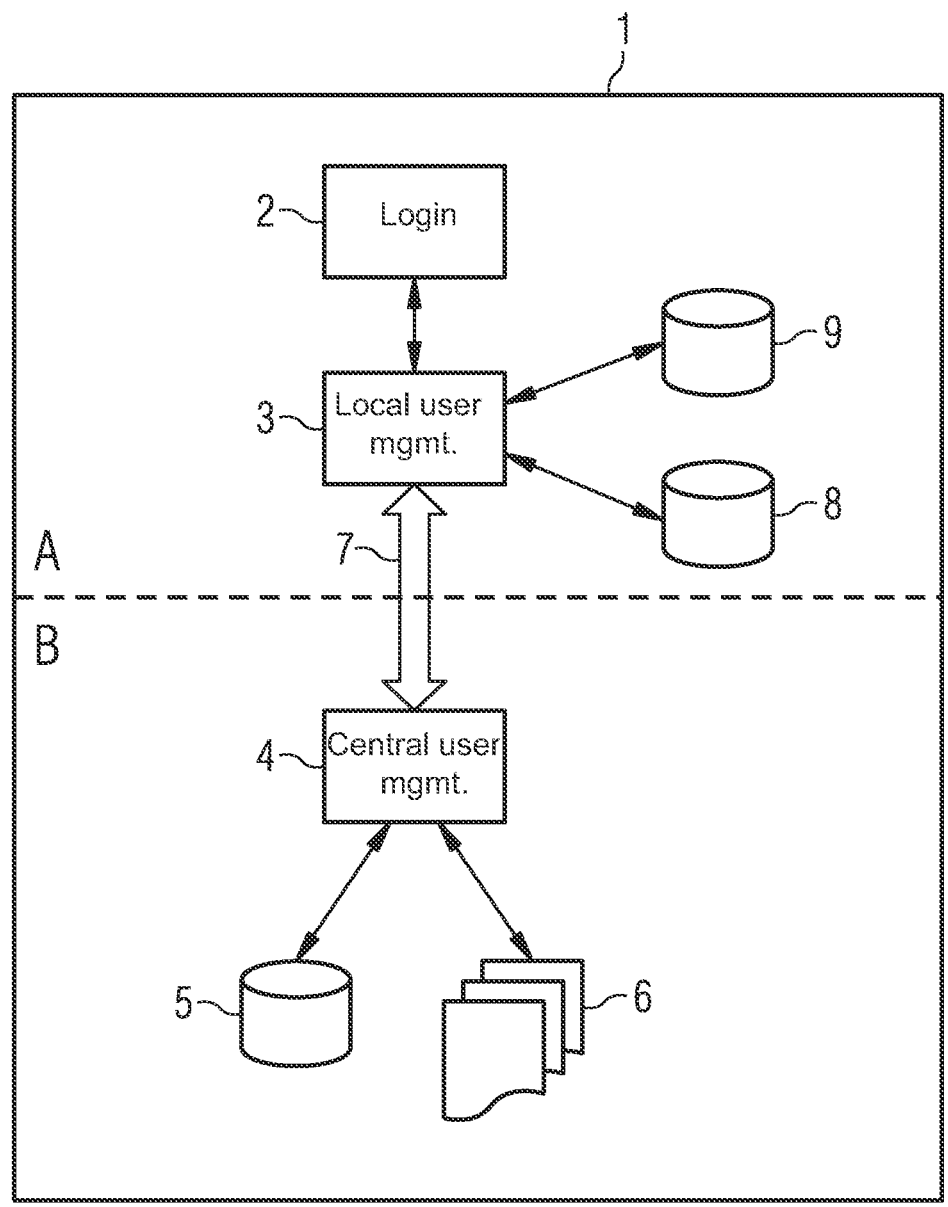

METHOD AND SYSTEM FOR DEFINING ADDITIONAL RESOURCES IN A USER MANAGEMENT SYSTEM OF A MANUFACTURING EXECUTION SYSTEM

CROSS-REFERENCE TO RELATED APPLICATION

This application claims the priority, under 35 U.S.C. §119, of European application EP 09180459, filed Dec. 22, 2009; the prior application is herewith incorporated by reference in its entirety.

BACKGROUND OF THE INVENTION

Field of the Invention

The present invention relates to a method, to a system, and to computer program product for defining additional resources in a MES user management system in a manufacturing execution system (MES). The method is directed to defining additional resources in a user management system in a MES system which includes at least one server and at least one client connected via a network connection. The server includes a users and groups database and a scripts file repository, the client includes an access database containing the capabilities of the users currently logged in. A local user management service at the client and a centralized user management service at the server are in communication via the network connection. At run time, at a given event, the centralized user management service transmits to the local user management service data on the logged user obtained from the users and groups database and data on a first set of scripts from the script files repository; in turn, the local user management service, by using also data on the user global resources built in the in-house product, creates the related entries into the access database and executes the set of scripts.

In the world of industrial automation of today, manufacturing companies, in order to improve their production capabilities, make use of IT infrastructures for industrial control and automation.

With time, such software products for industrial automation have increased in scope and refinement in order to fit the large variety of requirements of manufacturing companies.

As defined by the Manufacturing Enterprise Solutions Association (MESA International), a Manufacturing Execution System (MES) "is a dynamic information system that drives effective execution of manufacturing operations", by managing "production operations from point of order release into manufacturing to point of product delivery into finished goods" and by providing "mission critical information about production activities to others across the organization and supply chain via bi-directional communication."

In other words, the MES system is a set of software components that are used in order to control a manufacturing plant.

The functions that MES systems usually include, in order to improve quality and process performance of manufacturing plants, are resource allocation and status, dispatching production orders, data collection/acquisition, quality management, maintenance management, performance analysis, operations/detail scheduling, document control, labor management, process management and product tracking.

For example, Siemens Corporation offers a broad range of MES products, under its SIMATIC® product family.

In manufacturing plants, a variety of configurations enable the implementation of flexible machine concepts which require in the backbone rather complicated and sophisticated software solutions in order to enable the approach of integrated automation.

In MES systems, computer networks are arranged so that a multitude of users can access common network resources. A computer network typically includes at least one server and at least one workstation at the client side. The number of workstation may be dozens or hundreds. At the client side, each user has a workstation, typically a stand alone PC which is connected through a network connection to the other computers of the network.

As used herein, an MES in-house product is a set of software components developed by software developers to perform the core operations of a MES system. Usually the in-house product is delivered to the customer already compiled.

On top of the MES product a set of client MES applications can be built by third-parties to perform some useful actions within a MES system, e.g. monitoring values coming from plant process or controlling a plant device.

Typically, at engineering time, system engineers flexibly customize MES client applications according to the specific manufacturing plant requirements.

Instead, at runtime, MES client applications are utilized by end-users who may be plant operators or line responsible personnel.

A MES user management system is the part of the in-house MES product that manages the users, the groups and the resources assigned to the users and the groups.

As used herein, the term resource defines a function right assigned to a user or a group of users. A resource is a right to do something, e.g. to read from a given database, to write to a particular database or to accede to a particular database.

In order to be able to meet a large variety of manufacturing plant requirements, it is important that the MES user manage system be provided with certain characteristics.

A first desirable characteristic of the MES user management system is that it can be customized at engineering time and, in some scenarios, also at run-time in order to fulfill security and production needs in an optimal way. For example, it may occur that, at production time, it is necessary to make some configurations without halting the production machines in order to return at engineering time. For example, a line operator which usually is able to work on a production line at "full control" mode is, for a specific case, requested to work on one line in "full control" mode and in another line in "monitor control" mode. In such exemplary scenario, there might be the need of defining a new resource at run time.

A second desirable characteristic of the MES user management system is that it can be flexible and it can be decoupled from the in-house MES product in expanding the resource access configurations.

A third desirable characteristic of the MES user management system is that it is provided with a high degree of usability. For example, a user management systems should be able to support different widespread geographical locations (e.g. with a multilingual support and Unicode language devices) of network topologies often of large dimensions and of big complexity in a centralized way.

It is noted that it is more and more common to use, also in MES systems, network topologies with a "terminal service" workstation or a "zero cost" solution (e.g. a web solution) at the user side or client. The trend is to go towards clients with no product installed. Unfortunately, such workstation types are typically lacking the functionalities necessary to manage databases or to manage configuration tools.

An example of prior art in which the resources can be locally defined at the client side is disclosed in US 2003/

0065795 A1 and European published patent application EP 1 298 514 A1 (Siemens Corp.; Bortoloso, Dighero).

FIG.FIG. 1, similar to FIG.FIG. 1 of the above mentioned document, shows a block diagram with a MES computer system 1 comprising a central computer B, herein after called server, and at least one user workstation computer A, herein after called client A.

Client A and server B are in communication via a network connection 7.

The client A comprises, besides other modules not shown, a logon dialog component 2. The user access may happen by a logon dialog interface or by using a program developed with a specific set of APIs that performs a silent logon procedure. The logon dialog component 2 is coupled to a local user management service 3. The local user management service 3 provides local user management services, for example the management of requests arriving from a client application, not shown. The client A comprises a local resources database 8 and an access database 9 containing the capabilities of the user currently logged, such databases 8,9 are locally stored on the computer A and they are directly accessed by the local user manager service 3.

The server B comprises, besides other modules not shown, a centralized user management service 4, a users and groups database 5 and a repository of script files 6. The users and groups database 5 stores the properties of users and data of user groups. Examples of properties may be user company identification number, user e-mail address, company telephone number and other data. The script file repository 6 contains a collection of scripts to be executed for certain users, user groups or resources. Each of the script files may typically contain actions to be taken for a logged user having given resources. The script files may be executed at a given event, at logon or, e.g., when a given resource is accessed. For example, when a user logs in, the central user management service 4 looks, in the script files repository 6, for a set of scripts associated to the user or to any group to which the user is associated with and sends it to the client A, via the network connection 7, so that each script of the set can be executed usually at the client side A.

A given event may trigger the request of data exchange between the local user management service 3 and the centralized user management service 4 via the network connection 7. Examples of the given event may be the user logon, or an access of a particular resource or a personification of a user data.

At a given event, the information on the user obtained from the users and groups database 5 and the script set obtained from the script files repository 6 is transmitted over the network connection 7 to the client A from the centralized user management service 4. In response, at the remote side, the local user manager service 3, after having checked the presence of relevant data in the local resources database 8, creates an entry into the access database 9 for storing the capabilities of the currently logged-in.

Thus, the access database 9 will contain capabilities of the users currently logged such as properties, global resources and local resources. For sake of clarity, it is noted that the global resources transferred from the server B to the client A and to be stored in the access database 9 are not contained in any of the shown databases 5, 6, at the server side since they are built in the in-house software product.

As disclosed in the previously mentioned prior-art document, upon necessity, new resources can be defined locally at the client side A via a configuration tool which allows only limited customization possibilities. Such newly defined local resources are stored in the local resource database 8.

Unfortunately, the newly defined resource are local which means that are bound to the client workstation where are defined and are not directly visible to the global machine network.

It is therefore important to be provided with a system wherein resources are definable by the user and they are accessible directly by every network machine and every user terminal in an easy manner.

A desirable requirement in the MES environment is that operations on resources, i.e. the definition, the addition, the assignment, the deletion, are allowed without requiring a compilation of the in-house MES software product. In state of the art MES systems, this requirement is fulfilled only for local resources. However such local resources are not global and thus they are not visible from the global network.

Moreover, such local resources are custom, i.e. definable in an autonomous manner by the user, only via a product configuration tool, an extension of the local user manager service (3), but, unfortunately, they cannot be defined by a third-party application using APIs.

Moreover, such newly introduced local resources, lack characteristics of user friendliness and usability in term of support to languages, geographical and topological locations.

SUMMARY OF THE INVENTION

It is accordingly an object of the invention to provide a method and a system for defining additional resources in a MES user management system in a manufacturing executing system which overcome the above-mentioned disadvantages of the heretofore-known devices and methods of this general type and which provides, in particular, for the definition of global custom resources without requiring the compilation of the MES in-house software product.

With the foregoing and other objects in view there is provided, in accordance with the invention, a method for defining additional resources in a user management system in a manufacturing execution system, the system including at least one server and at least one client connected via a network connection, the server having a users and groups database and a scripts file repository, the client having an access database containing capabilities of currently logged users, and wherein a local user management service at the client and a centralized user management service at the server are in communication via the network connection, the method which comprises:

a) at run time, at a given event: transmitting from the centralized user management service to the local user management service data on the logged user obtained from the users and groups database and data on a first set of scripts from the scripts file repository; in turn, creating with the local user management service, by also using data on the user global resources built in the in-house product, related entries into the access database and executing the set of scripts;

b) providing a custom resource database at the server side with entries editable at engineering time or at run time;

c) at engineering time or at run time, requesting with a client application, via the local user management service, the definition of an additional resource defined as a custom resource, to the centralized user management service, and adding with the centralized user management service an entry related to the requested custom resource in the custom resource database;

d) at run time, at a given event: transmitting from the centralized user management service, in addition transmitting the data of step a), to the local user management service, additional data from the custom resource database concerning the custom resources associated with the user and user groups as well as additional data on a second set of script files associated to the custom resources; and in turn, creating with the local user management service also with the additional data the related entries into the access database and executing the second set of scripts.

In other words, the above and other objects are achieved by a method, a system and a computer program product for defining additional resources in a user management system in a MES system comprising at least one server and at least one client connected via a network connection, the server comprising a users and groups database and a scripts file repository, the client comprising an access database containing the capabilities of the users currently logged, wherein a local user management service at the client and a centralized user management service at the server are in communication via the network connection, and wherein, (a) at run time, at a given event, the centralized user management service transmits to the local user management service data on the logged user obtained from the users and groups database and data on a first set of scripts from the script files repository; in turn, the local user management service, by using also data on the user global resources built in the in-house product, creates the related entries into the access database and executes the set of scripts.

The invention further comprising:

providing a custom resource database at the server side with entries editable at engineering time or at run time;

at engineering or at run time, by a client application, via the local user management service, requesting the definition of an additional resource, hereinafter called custom resource, to the centralized user management service, which in turns adds an entry related to the requested custom resource in the custom resource database;

at run time, at a given event, the centralized user management service, beside transmitting the data of item (a) to the local user management service, it transmits also, from the custom resource database, additional data on the custom resources associated to the user and user groups as well as additional data on a second set of script files associated to the custom resources; in turn, the local user management service creates also with said additional data the related entries into the access database and executes said second set of scripts.

In the invention, the given event may be preferably selected from the group consisting of:
 user logon;
 access of a given resource;
 personification of a user data.

In the invention, the custom resources may advantageously be defined by means selected from the group consisting of:
 by a program with a proper API set;
 by a configuration file;
 by a GUI configuration tool.

In the invention, the MES system may be conveniently provided with a local resource database at the client side and wherein:

item c) may further include the sub-item of: at engineering or at run time, by the client application, via the local user management service, requesting the definition of an additional local resource and, in turn adding a an entry related to the requested local resource in the local resource database (8);

item d) may further includes the sub-item of: at run time, at a given event, by the local user management service loading from the local resource database 8, data on local user resources for building the capabilities of the users currently logged in the access database.

Embodiments of the invention allow the definition of global resources which are visible to the global network in a flexible manner without requiring a re-compilation of the in-house MES product.

Moreover, embodiments of the invention allow the definition of global resources via third party applications without influencing the in-house software product.

In addition, with the proposed invention, it is possible to integrate between resource and capabilities of modules, libraries, services and other applications developed by third parties without requiring the re-compilation of the in-house MES product.

With the proposed invention, it is possible to extend the in-house product in a modular way so that each component can enlarge or modify his own set of function rights and capabilities in every moment and according to his functionalities and operating requirements without requiring the re-compilation of the in-house MES product.

Other features which are considered as characteristic for the invention are set forth in the appended claims.

Although the invention is illustrated and described herein as embodied in defining additional resources in a MES user management system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE SEVERAL VIEWS OF THE DRAWING

FIG. 1 is a block diagram which schematically illustrates a prior art MES computer system (described above); and FIG. 2 is a block diagram which schematically illustrates a MES computer system according to an exemplary embodiment of the invention.

DETAILED DESCRIPTION OF THE INVENTION

Figure 2:
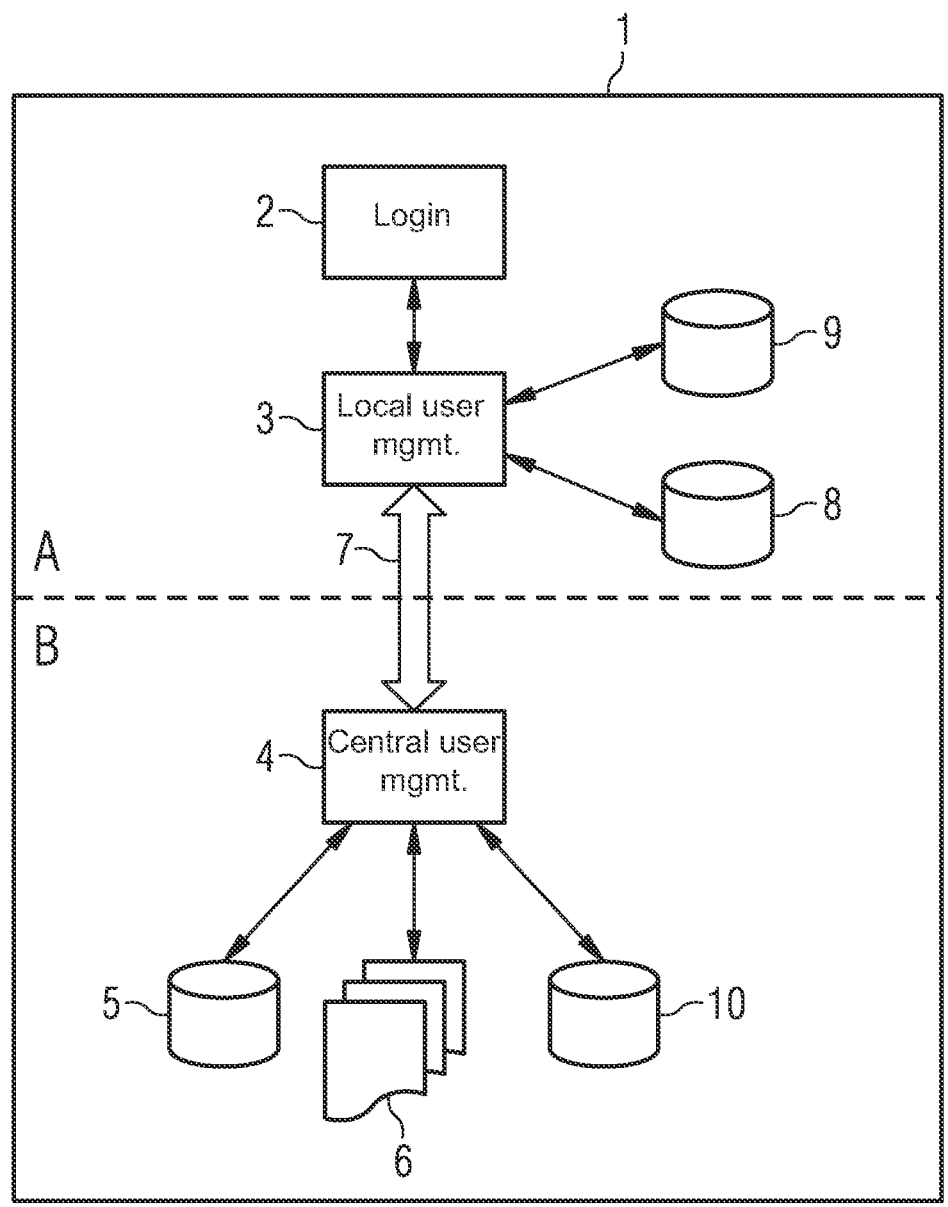

Referring now once more to the figures of the drawing in detail and, particularly, to FIG.FIG. 2 thereof, there is shown a MES system 1 comprising a server B and a client A connected via a network connection 7. The server B comprises:
 a logon dialog component 2;
 a centralized user management service 4;
 a users and groups database 5;
 a scripts file repository 6;
 a custom resource database 10, containing entries on custom resources editable at engineering time or at run time. Custom resources are resources which are definable autonomously from a client, being the client a user (via a GUI) or a client application (via APIs).

The client A comprises:
 local user management service;
 an access database 9 containing the capabilities of the users currently logged and their resources;
 optionally, a local resource database 8 containing local resources.

The user management service comprises the local user management service 3 at the client side A and the centralized user management service 3 at the server side B, in communication via the network connection 7.

At run time, at a certain given event, the local user management service 3 builds the capabilities, i.e. user properties and user resources, of the users currently logged in the access database 9. Such certain given events may include a logon of a user, an access of a given resource, or a personification of a user data.

Here below the steps required for building the capabilities of the users currently logged in the access database 9:

the centralized user management service 4 transmits to the local user management service 3 data on the logged user obtained from the users and groups database 5 and data on a set of scripts associated to the user from the script files database 6.

afterwards, the local user management service 3, which also takes into account the data on the user global resources built in the in-house product, creates the related entries into the access database 9 and executes the set of scripts.

It is noted that the set of scripts associated to the user, being a set, may include zero, one, two or more scripts.

At engineering or at run time, a client application, via the local user management service 4, requests the definition of an additional resource, called custom resource, to the centralized user management service 3, which in turns adds an entry related to the requested custom resource in the custom resource database 10. The added entry, being at the server side B, is directly available for all the machines belonging to the network.

Examples of client application which request the definition of additional custom resources may comprise web modules for archiving historical data, applications providing product statistics applications monitoring a plant and other.

At run time, at a given event, the centralized user management service 4, beside transmitting the data necessary to build the capabilities of the users currently logged in the access database 9 to the local user management service, as above explained, it transmits also, from the custom resource database 10, additional data for further building the capabilities of the users currently logged, this further data include data on the custom resources associated to the user and user groups as well as additional data on a second set of script files associated to the custom resources. Afterwards, the local user management service 3 creates also with this additional data the related entries into the access database 9 and executes this second set of scripts.

As above explained, when the local user manager service 3 builds the user capabilities database 9, it loads, by means of the centralized user manager service 4, from the custom resources database 10, all the custom resources that are associated to the relevant users and the user groups.

A custom resource has advantageous characteristics in terms of usability and user-friendliness in that it may include some attributes such as for example the name, the language, the geographical location allowing localization according to customer requirements.

Advantageously, the proposed solution has only one centralized customer resource database 10 at the server side B that the system keeps aligned with the workstations and independent from the location of the resources. The custom resource database 10 is provided to assign user resources, accessible by the centralized user management service 4. However, in embodiments of the invention, backups of the custom resource database may be provided for redundancy reasons via backup and restoring tools.

Prior art solutions need many databases of local resources, each one defined in a single workstation and with the single workstation as scope, a for example the local resource database 8 at the client side A.

In an embodiment of the invention, custom resources may be defined autonomously via a client application in a local manner by using a local resource database 8. Also in the above described prior art solution, resources may be defined locally by a configuration tool in the local resource database 8. However, in the above described prior art solution, the local resources have only a limited number of attributes while, with this embodiment of the present invention, also the local resources, being custom, have characteristics in term of usability and user-friendliness. The additional steps involved in this invention embodiment are briefly described as follow:

at engineering or at run time, the client application, requests also the definition of a local custom resource to the local user management service 3, which in turns adds an entry related to the requested custom local resource in the local resource database 8. The added entry, being at the client side A, is directly available only to the local client;

at run time, at a given event, the local user management service 3 loads from the local resource database 8, data on local user resources for building the capabilities of the users currently logged in the access database 9.

The custom resources are referred to in two ways, both via a name and via a numerical identifier. Both ways may be used as search key to access the custom resource itself.

In embodiments of the invention, the custom resource database 10 is separated into different address areas for different global custom resources, i.e. global custom resources for in house external application, for in-house product extension, for third-parties external application and other.

In embodiment of the invention, the customer resource database address area may be kept aligned with all the machines of the network by an updating program implemented by one of the RAC servers.

In an example embodiment, values of the resources identifiers may be divided in ranges as follows:

0-1999: "global resources" not custom, built-in in the software in-house product;

2000-3999: "local resources" saved for third party external applications. Such local resources may be non-custom, i.e. defined via the configuration tool, or custom, having thus a variety of attributes.

4000-10000: "local resources" saved for in-house external applications. Such local resources may be non-custom, i.e. defined via the configuration tool, or custom, having thus a variety of attributes.

10001-20000: "global custom resources" saved for in-house external applications.

20000-25000: "global custom resources" saved for in-house product extensions.

25001-30000: "global custom resources" saved for third party external applications.

30001-40000: "floating global custom resources", resources for which the system gives automatically the identifier. In fact, the numerical identifiers of the custom resources may be assigned at the resource installation either in a predetermined manner or via an automatic generation through a resource access control which generates a numerical identifier free at the moment the resource installation.

Those of skill in the pertinent art will appreciate that the numerical ranges above exemplified may be varied without departing from the scope of the invention.

The custom resources may be defined, deleted or modified in three ways.

According to a first possibility, the custom resources may defined, deleted or modified by a program with a proper API set (e.g. COM methods and .NET methods) supplied by the application developer.

According to a second possibility, the custom resources may be defined, deleted or modified by a proper configuration file (with several extensions).

According to a third possibility, the custom resources may be defined, deleted or modified by a proprietary GUI configuration tool allowing custom attributes.

After putting global and local custom resources in the system, each resource may be associated to groups. These groups are roles or set function rights identified by a name and an identifier, that in their turn are associated with the various users. Global and local resources can be linked with the users.

Resources may be associated to user either by a program with a proper API set (e.g. COM and Net methods) given by the application developer or by a proprietary configuration tool with a GUI interface.

After associating the resource with the user by the previously described ways, a merging procedure starts during the logon or when the user personifies. The merging procedure is gathering all the resources of a user from all the resources of the groups the user is associated with, in an intelligent manner in order to avoid resource multiplication. In fact, many groups can be associated with a same user and therefore, global or local custom resources, linked to each group, are gradually merged into those associated with the other groups (the same resource may appear several times, even if on different levels and in different groups). The merging takes place according to the "higher privilege" rule so that, in case of sharing of the same resource, the configuration providing wider rights to the user is used.

The following acronyms are used in the specification and they are understood to carry the following meaning:
API Application Programming Interface
GUI Graphical User Interface
MES Manufacturing Execution System
PC Personal Computer
RAC Resource Access Control

The invention claimed is:

1. A method for defining additional resources in a user management system in a manufacturing execution system, the system including at least one server and at least one client connected via a network connection, the server having a users and groups database and a scripts file repository, the client having an access database containing capabilities of currently logged users, and wherein a local user management service at the client and a centralized user management service at the server are in communication via the network connection, the method which comprises:

a) at run time, at a given event,
transmitting from the centralized user management service to the local user management service data on the logged user obtained from the users and groups database and data on a first set of scripts from the scripts file repository;
in turn, creating with the local user management service, by also using data on a user global resources built in an in-house product, related entries into the access database and executing the set of scripts;

b) providing a custom resource database at the server side with entries editable at engineering time or at run time;

c) at engineering time or at run time, requesting with a client application, via the local user management service, that an additional resource be defined as a custom resource, from the centralized user management service, and adding with the centralized user management service an entry related to the requested custom resource in the custom resource database;

d) at run time, at a given event:
transmitting from the centralized user management service, in addition transmitting the data of step a), to the local user management service, additional data from the custom resource database concerning the custom resources associated with the user and user groups as well as additional data on a second set of script files associated to the custom resources; and
in turn, creating with the local user management service also with the additional data the related entries into the access database and executing the second set of scripts.

2. The method according to claim 1, wherein the given event is selected from the group consisting of:
a user logon;
an access of a given resource; and
a personification of a user data.

3. The method according to claim 1, wherein the custom resources are defined by a program with a proper API set, by a configuration file; or by a GUI configuration tool.

4. The method according to claim 1, wherein the MES system is provided with a local resource database at the client side and wherein:
step c) further comprises, at engineering time or at run time, requesting with the client application, via the local user management service, the definition of an additional local resource and, in turn adding an entry related to the requested local resource in the local resource database; and
step d) further comprises, at run time, at a given event, loading with the local user management service from the local resource database, data on local user resources for building the capabilities of the users currently logged on to the access database.

5. In a manufacturing execution system having at least one server and at least one client connected via a network connection, the server having a users and groups database and a scripts file repository, the client having an access database containing capabilities of currently logged-on users, and wherein a local user management service at the client and a centralized user management service at the server are in communication via the network connection, a system for defining additional resources in a user management system of the manufacturing execution system, the system being configured to execute the method according to claim 1.

6. .A computer program product including a non-transitory medium having computer code stored thereon, which, when read into a main memory of at least one computer, is configured to perform the steps of the method according to claim 1.

* * * * *